United States Patent

[11] 3,554,378

[72] Inventor Arthur L. Kohl
       Woodland Hills, Calif.
[21] Appl. No. 740,868
[22] Filed June 28, 1968
[45] Patented Jan. 12, 1971
[73] Assignees North American Rockwell Corporation

[54] REVERSE OSMOSIS MODULE HAVING SPIRALLY WRAPPED REVERSE OSMOSIS MEMBRANE FABRIC
14 Claims, 9 Drawing Figs.

[52] U.S. Cl. .................................................. 210/321,
       210/323, 210/433, 210/494, 210/500
[51] Int. Cl. ................................................ B01d 31/00
[50] Field of Search .......................................... 210/23,
       321, 494, 497.1, 500, 506, 507, 508; 55/16, 158;
       210/323, 433

[56] References Cited
UNITED STATES PATENTS
| | | | |
|---|---|---|---|
| 3,342,729 | 9/1967 | Strand | 210/321X |
| 3,397,790 | 8/1968 | Newby et al. | 210/321 |
| 3,401,798 | 9/1968 | Nyrop | 210/321 |

Primary Examiner—Frank A. Spear, Jr.
Attorneys—H. Frederick Hamann and L. Lee Humphries ABSTRACT: A reverse osmosis module that minimizes concentration polarization and product fluid pressure drop effects by the use of a fabric having selected hollow fibers. One or more panels of the formed fabric are attached to and spirally wound around a tube and the spirally wrapped unit is inserted into a cylindrical pressure vessel so that a product fluid can be obtained from a feed fluid by the principle of reverse osmosis.

PATENTED JAN 1 2 1971
3,554,378
SHEET 1 OF 2
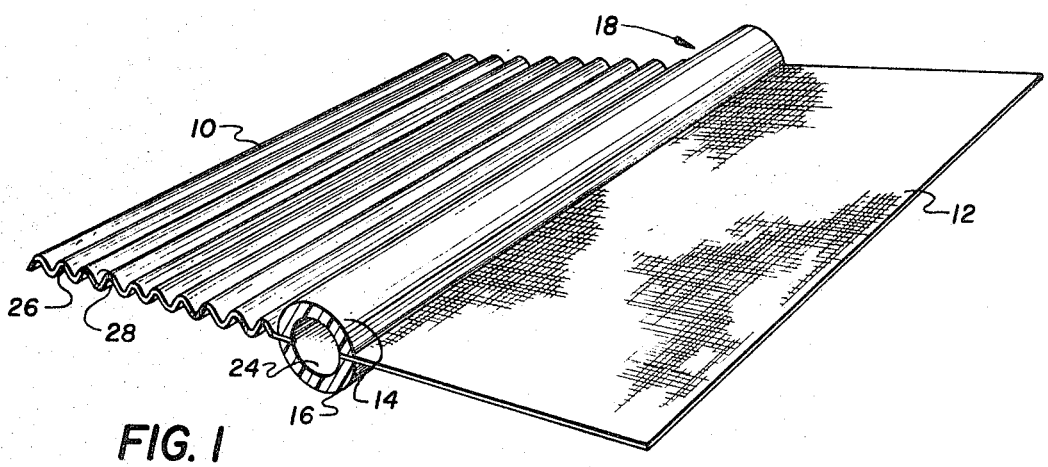
FIG. 1
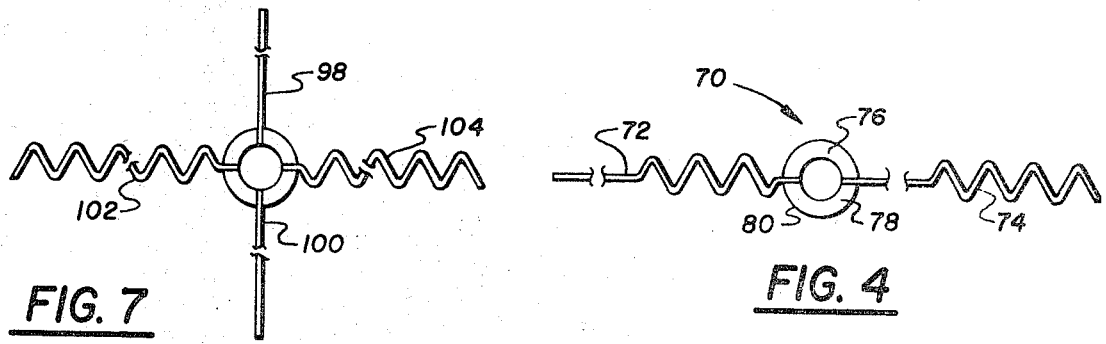
FIG. 7
FIG. 4
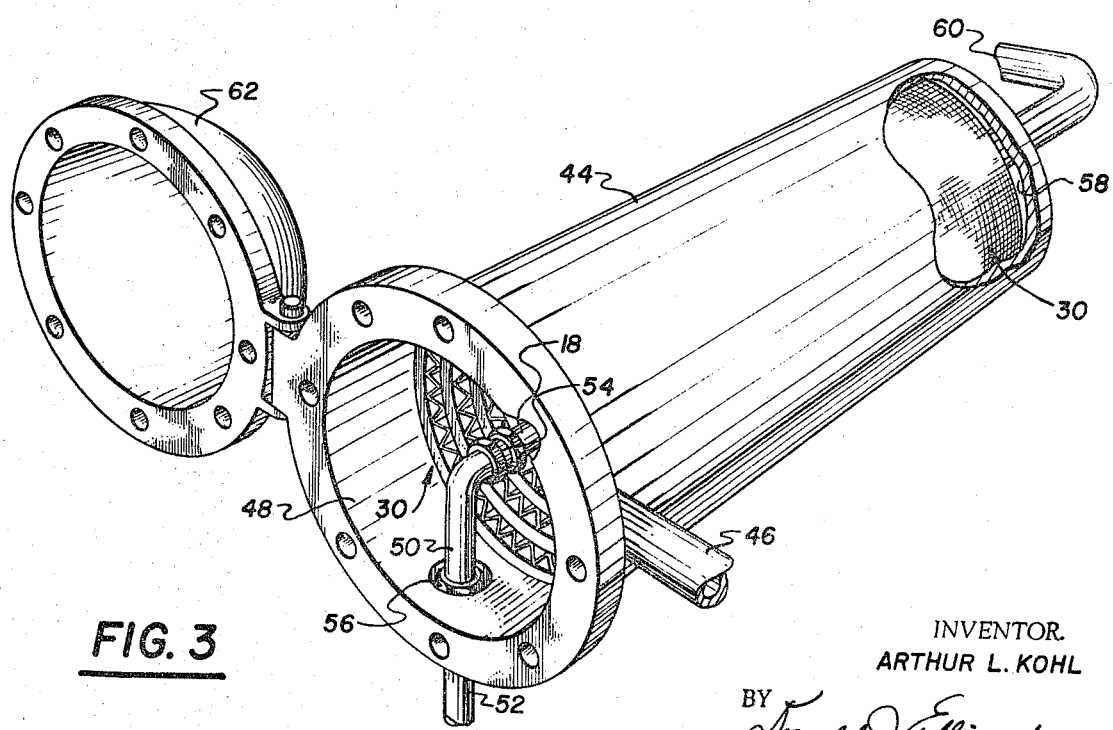
FIG. 3
INVENTOR.
ARTHUR L. KOHL
BY
Donald J. Ellingsberg

INVENTOR.
ARTHUR L. KOHL 3,554,378

REVERSE OSMOSIS MODULE HAVING SPIRALLY WRAPPED REVERSE OSMOSIS MEMBRANE FABRIC

CROSS-REFERENCE TO RELATED APPLICATION

Copending application Ser. No. 740,867 "Reverse Osmosis Fabric", Arthur L. Kohl; filed even date herewith and assigned to the same assignee as the present invention.

BACKGROUND OF THE INVENTION

The need for water in the world is basic. To satisfy this need, appropriate emphasis is being placed on developing processes that will economically produce pure water from sea water, or from other saline or brackish waters.

One process that produces pure water is the reverse osmosis process. When saline water and pure water are separated by a semipermeable membrane, osmosis creates a flow of pure water through the membrane, into the saline water. If the saline water is subjected to a pressure greater than the natural osmotic force, the process is reversed and pure water in the saline water is forced through the membrane to the pure water side, leaving concentrated salts behind.

Desalination systems using the reverse osmosis process can be economical for saline water conversion because of simplicity and the near approach to an ideal thermodynamic system. A reverse osmosis system that will produce a product fluid such as pure water at a cost low enough to make it economically attractive will require efficient reverse osmosis membranes and/or membrane structures. The membranes should provide a maximum surface area per unit volume with a long operating life.

Hollow reverse osmosis fibers represent a near-optimum configuration for reverse osmosis systems because they eliminate the need for backing material or plates, minimize sealing requirements, and provide a very large surface to volume ratio. A considerable amount of work has been done (and continues) on hollow fiber technology.

One reverse osmosis system uses hollow fibers in an operational system. This system has millions of small diameter hollow fibers, e.g. 25 to 250 microns, outside diameter with a wall thickness of 5 to 50 microns, that are suitably retained as a tube-sheet bundle of parallel oriented fibers. (See Design News, July 19, 1967, p. 18.) The parallel orientation of the fibers in the bundle increases the concentration polarization effect[1],1. The salinity of a feed fluid layer adjacent the outer working surface of a reverse osmosis membrane will increase as a product fluid passes from the feed fluid through the membrane. Osmotic pressure must then be increased to overcome this concentration polarization effect and maintain the flow of the product fluid through the membrane. Where the reverse osmosis membranes are millions of hollow fibers oriented in a parallel relationship in an extended tubular container, the flow of feed fluid parallel to the individual fiber surfaces increases the concentration polarization effect and increases the hydraulic losses experienced by the product fluid flow through the hollow fibers when the bundle is formed from relatively long fibers; extended fiber lengths are required in the parallel orientation of the tube-sheet bundle to optimize the system configuration and minimize tube sheet requirements, and to develop the desired maximum working surface area per unit volume.

A spirally wrapped reverse osmosis module has been proposed as an apparatus particularly useful in desalinating brackish water or sea water and obtaining pure water as disclosed in U.S. Pat. No. 3,367,504 . However, the pure water flows spirally through a backing material in the disclosed apparatus and experiences a substantial drop in pressure. Compensation for this undesirable pressure drop is provided in the disclosed apparatus by inserting a plurality of drain tubes in a predetermined spacing so that the pure water is drained from the backing material as the pure water traces the spiral path to the central tube. This compounds the already extant sealing problems that are inherently associated with the membrane layup of the disclosed apparatus.

OBJECTS OF THE INVENTION

Accordingly, it is an object of the invention to provide a new and improved reverse osmosis module for the recovery of a product fluid from a pressurized feed fluid by reverse osmosis principles.

It is an object of the invention to provide a reverse osmosis module that substantially minimizes concentration polarization during operation.

It is an object of the invention to provide a reverse osmosis module that substantially reduces product fluid pressure losses during operation.

It is an object of the invention to provide a reverse osmosis module having a maximum working surface area per unit volume.

It is an object of the invention to provide a reverse osmosis system having a replaceable reverse osmosis module.

It is an object of the invention to provide a reverse osmosis module that produces a high quality product fluid.

It is an object of the invention to provide a reverse osmosis system having a reverse osmosis module that minimizes sealing problems of reverse osmosis membranes used in such modules.

SUMMARY OF THE INVENTION

Briefly in accordance with one form of the invention, a reverse osmosis module has one or more panels formed from hollow fibers having reverse osmosis characteristics. The panels are spirally wound around a tube that is in fluid communication with selected fibers in the panels and collects a product fluid issuing therefrom. A suitable spacer arrangement can be used to separate adjacent spiral layers and develop fluid channels for a pressurized feed fluid to pass through the module. Alternatively, the panels can incorporate components or configurations which effectively separate adjacent active hollow fiber layers.

The reverse osmosis module is positioned within a pressure vessel in the disclosed form of the invention. The pressure vessel channels the pressurized feed fluid to the module, directs the collected product fluid from the vessel, and removes the remaining feed fluid or brine from the vessel after the product fluid has been forced from the feed fluid through the fiber walls in accordance with the principles of reverse osmosis.

BRIEF DESCRIPTION OF THE DRAWING

FIG. 1 is a perspective view of one form of unwound reverse osmosis module formed in accordance with the invention;

FIG. 3 is a perspective view of one form of pressure vessel for use with a reverse osmosis module of the invention;

FIG. 4 is a schematic view of another form of unwound reverse osmosis module;

FIG. 7 is a schematic view of another form of unwound reverse osmosis module;

DESCRIPTION OF THE INVENTION

Figure 2:
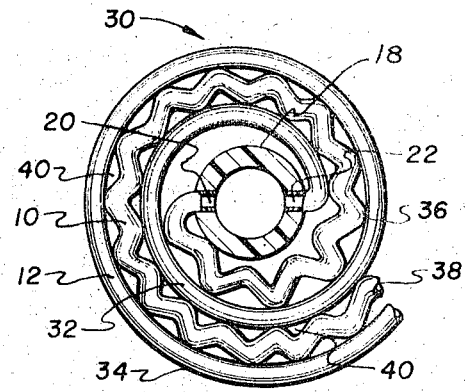
FIG. 2 is an enlarged sectional view, partly broken away, of the module of FIG. 1 as spirally wound.

Referring to FIG. 1, reverse osmosis fabric panels 10 and 12, which can be formed in accordance with the teachings of my copending application S. N. 740,867, "Reverse Osmosis Fabric," filed even date herewith and assigned to the same assignee as the present invention, are sealed between the complementary parts 14 and 16 of a tube 18 so that the hollow fiber ends 20 and 22 of the relatively long and narrow panels 10 and 12, respectively (see FIG. 2), are in fluid communication with a tube channel 24 defined by the assembled tube. Fabric panel 10 is nonplanar and as shown by FIG. 1 is corrugated with similar ridges 26 and grooves 28 oriented generally parallel with the longitudinal axis defined by tube 18. The corrugated panel 1 provides a self-spacing arrangement and a plurality of channels when the fabric panels are rolled into a working unit as will be described.

In FIG. 2, a module or unit 30 is formed by winding the fabric panels 10 and 12 around the tube 18 in spiral layers. When the fabric panels 10 and 12 are spirally wound on the tube 18, the finished module 30 has the adjacent spiral layers, such as layers 32 and 34, of the spirally wound fabric panel 12 spaced apart by the adjacent spiral layers, such as layers 36 and 38, of the corrugated panel 10. This arrangement of spiral-layered panels 10 and 12 develops a plurality of similar fluid channels 40 for the passage of a selected fluid between the spiral layers as shown that extend longitudinally in a generally parallel relationship with the spiral axis as defined by tube 18.

The module 30 is positioned within a suitable means that maintains a pressurized feed fluid in contact with the module, such as pressure vessel 44 as shown by FIG. 3. The pressure vessel 44 and contained module 30 form a reverse osmosis system. The pressurized feed fluid such as sea water or other saline water or brackish water is introduced from a feed fluid source (not shown) through a feed fluid inlet 46 into the pressure vessel. The feed fluid passes through a feed fluid plenum chamber 48 within the pressure vessel into the module 30 through the similar fluid channels 40, as particularly shown by FIG. 2. A product fluid, such as pure water, is forced from the feed fluid through the walls of the hollow working fibers of the fabric panels 10 and 12 by the reverse osmosis process. The product fluid passes through the hollow working fibers in a spiral direction and issues from the hollow fiber ends, such as fiber ends 20 and 22 as shown by FIG. 2, into the tube channel 24 of the tube 18 where the product fluid collects. The collected product fluid passes from the tube 18 through a header conduit 50 to a product fluid collects. The collected product fluid passes from the tube 18 through a header conduit 50 to a product fluid outlet 52. Conventional unions 54 and 56 connect the header conduit 50 to the tube 18 and the product fluid outlet 52. Since the feed fluid contains salts that remain dissolved in a concentrated solution after the removal of the product fluid, the balance of the pressurized feed fluid or brine passes from the module 30 into a brine plenum chamber 58 within the pressure vessel and passes from the vessel through a brine outlet 60 to a brine collection system (not shown). A hinged lid 62 completes the pressure vessel.

Referring to FIG. 4, another form of module or unit 70 similar to module 30 is shown by FIGS. 1 and 2 has reverse osmosis fabric panels 72 and 74 sealed between the parts 76 and 78 of a tube 80. Fabric panel 72 is nonplanar, e.g. corrugated, for about one-half of its relatively narrow width at the inner one-half of the fabric panel adjacent the tube, while fabric panel 74 is corrugated for about one-half of its relatively narrow width at the outer one-half of the fabric panel. When the fabric panels 72 and 74 are spirally wound around the tube 80, the inner spiral portion of panel 72 adjacent the tube is generally nonplanar while the outer spiral portion is planar. The intermediate spiral layers of panel 74 have the planar inner spiral portion of panel 74 adjacent the tube and the nonplanar outer spiral portion. This form of module 70, therefore, has the lengths of the respective fluid paths in the hollow working fibers that form the fabric panels 72 and 74 substantially equal, whereas the lengths of the respective fluid paths in the fabric panels 10 and 12 of FIG. 1 are generally unequal since only panel 10 is corrugated. The hydraulic pressures losses in fabric panels 72 and 74 are therefore more nearly equal.

Figure 5:
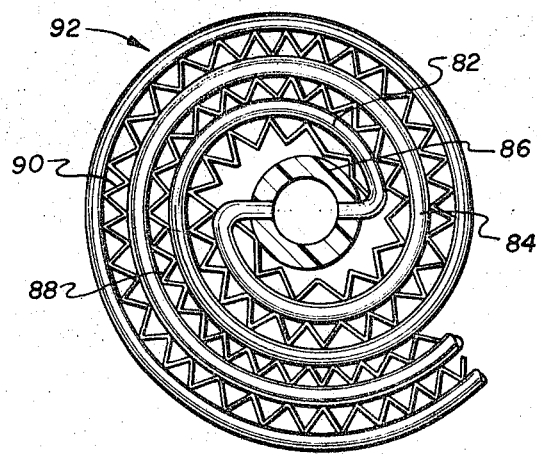
FIG. 5 is an enlarged sectional view, partly broken away, of another form of reverse osmosis module as spirally wound.

Referring to FIG. 5, it is contemplated that uncorrugated or flat fabric panels 82 and 84, similar to fabric panel 12 of FIG. 1, could be joined to a tube 86 with formed spacer members, such as corrugated members 88 and 90, or a suitable spacer material such as a loosely-woven fabric, positioned between the fabric panels as the panels are spirally wound around the tube into a module or unit 92.

Figure 6:
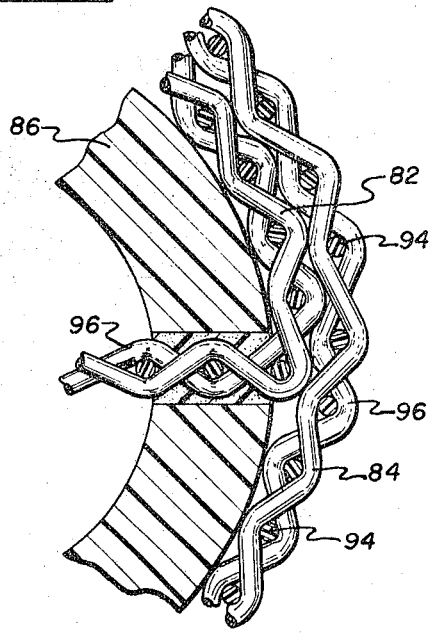
FIG. 6 is an enlarged sectional view of a portion of another form of reverse osmosis module as spirally wound.

Referring to FIG. 6, it is further contemplated that uncorrugated or flat fabric panels 82 and 84 as shown by FIG. 5, could be joined to tube 86 without spacer members, such as corrugated members 88 and 90 as shown by FIG. 5, could be joined to tube 86 without spacer members, such as corrugated members 88 and 90 as shown by FIG. 5. Where the fabric panels 82 and 84 are loosely woven with relatively large-diameter warp or support fibers 94 formed from solid fibers and woof fibers 96 formed from hollow fibers, the resulting spirally wound module would have a high packing density and improved fluid contact with the hollow fibers 96.

FIG. 7 shows another unwound module that has several panels circumferentially spaced around and connected to a central tube. Flat or planar fabric panels 98 and 100 aligned in a common plane and nonplanar or corrugated fabric panels 102 and 104 aligned in a common plane rotated about 90° from the plane defined by the flat fabric panels. A resulting module, when panels 98, 100, 102, and 104 are spirally wound, is structurally and functionally similar to the module 30 of FIG. 2.

Figure 8:
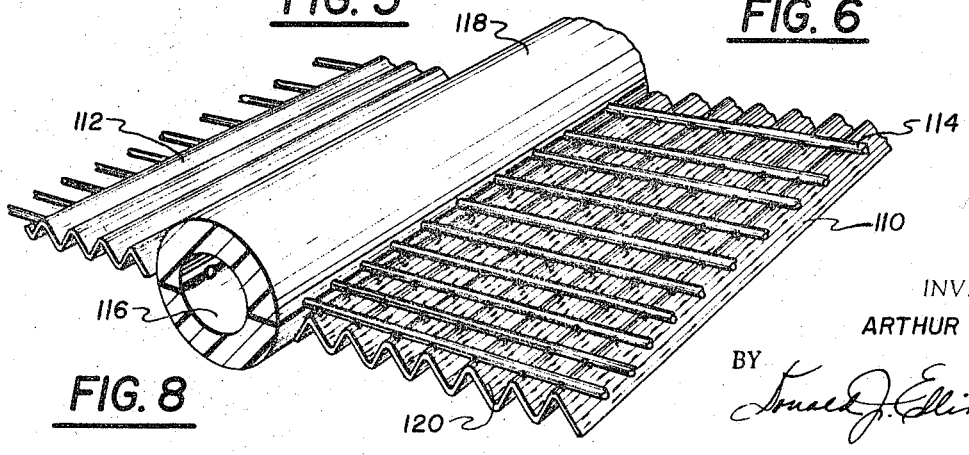
FIG. 8 is a perspective view of another form of unwound reverse osmosis module.

FIG. 8 shows another unwound module that has panels 110 and 112 generally aligned in a common plane. Panels 110 and 112 can be classed as a nonwoven fiber array having similar hollow fibers 114 in fluid communication with a tube channel 116 defined by assembled tube 118. The hollow fibers 114 are bonded to a generally corrugated member 120 that can be formed from a relatively flexible plastic, or the like. A resulting module, when panels 110 and 112 are spirally wound, is structurally similar to the module 92 of FIG. 5 since the corrugated member 120 functions as a spacer and develops a plurality of similar fluid channels through the module.

The total number, from one to a plurality, and the type, i.e. structural form, of fabric panels in a module or unit formed in accordance with my invention are primarily determined on the basis of hydraulic losses, required reverse osmosis system capacity, and similar system factors.

Figure 9:
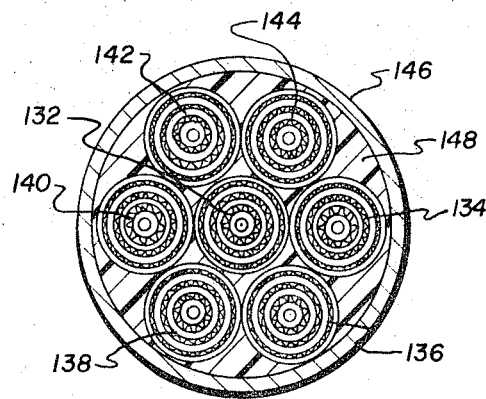
FIG. 9 is a sectional elevation of a pressure vessel for use with a plurality of selected reverse osmosis modules of the invention.

Referring to FIG. 9, it is contemplated that plural modules or units 132, 134, 136, 138, 140, 142, and 144, similar to those modules which have been described and shown, e.g. module 30 as shown by FIG. 2, can be positioned within a pressure vessel 146 to form a reverse osmosis system. The center tubes of each module 132, 134, 136, 138, 140, 142, and 144 are connected together in a convention manifold arrangement (not shown) so that the total product fluid collected by the individual modules is directed through a common header conduit and issues from the pressure vessel 146. The remaining pressure vessel volume between the modules, e.g. as schematically shown at 148, can be filled-in with suitably formed plug inserts, potting compound, or the like.

The reverse osmosis module of my invention having the improved spirally-wound reverse osmosis fabric provides a highly efficient system having low pressure drop channels for high velocity flow of pressurized feed fluid adjacent to the hollow working fiber surfaces of the fabric panels formed therefrom. The reverse osmosis module further provides an arrangement that substantially minimizes concentration polarization effects by the inherent turbulent flow resulting from the passage of a pressurized feed fluid through the fluid channels developed by the fabric panels which expose a generally nonparallel working surface to the feed fluid flow. The reverse osmosis module also minimizes the distance that the product fluid must flow in an individual hollow working fiber.

The reverse osmosis system with the module or modules further utilizes the total pressure vessel volume so that substantially all of the available space within the pressure vessel is occupied by the flowing pressurized feed fluid, the reverse osmosis module or modules, and the flowing product fluid.

I claim:

1. A reverse osmosis spiral module for collecting a product fluid from a pressurized feed fluid, the spiral module comprising:
   a. collector tube means defining a longitudinally extending product fluid tube channel, and
   b. a plurality of spiral reverse osmosis fabric panels in which selected portions of each of said fabric panels are nonplanar cooperating with said tube means and having adjacent spiral layers wound around said tube means.
   c. said spiral panels defining product fluid flow passages connected to said tube channel and maintained in fluid contact with the pressurized feed fluid so that a product fluid forced from the feed fluid into said flow passages passes into said tube channel.

2. The spiral module of claim 1 in which said fabric panels are connected to said collector tube means at circumferentially spaced positions on said tube means.

3. The spiral module of claim 2 in which said fabric panels are woven.

4. The spiral module of claim 2 in which said fabric panels are nonwoven.

5. The spiral module of claim 4 in which said nonplanar portions are corrugated.

6. The spiral module of claim 1 in which alternate ones of said fabric panels have an inner spiral portion adjacent said collector tube means generally nonplanar and an outer spiral portion generally planar, and intermediate ones of said fabric panels have an inner spiral portion generally planar and an outer spiral portion generally nonplanar.

7. The spiral module of claim 6 in which said nonplanar portions are suitably corrugated.

8. A reverse osmosis spiral module for collecting a product fluid from a pressurized feed fluid, the spiral module comprising:
   a. collector tube means defining a product fluid tube channel and further defining a longitudinally extending axis of the spiral module,
   b. spiral reverse osmosis nonwoven fabric panels cooperating with said tube means and having adjacent spiral layers wound around said tube means and thereby around said axis,
   c. said spiral panels defining product fluid flow passages connected to said tube channel and maintained in fluid contact with the pressurized feed fluid so that a product fluid forced from the feed fluid into said flow passages passes into said tube channel, and
   d. spacer means cooperating with and bonded to said spiral panels generally defining longitudinally extending feed fluid passages between said adjacent spiral layers of said panel means that are oriented parallel with said axis and generally transverse to said product fluid flow passages.

9. The spiral module of claim 8 in which said spacer means are formed from a flexible plastic material.

10. The spiral module of claim 8 in which said spacer means are corrugated.

11. A reverse osmosis system for collecting a product fluid forced from a pressurized feed fluid, the system comprising:
    a. a plurality of reverse osmosis spiral module means positioned within pressure vessel means for collecting the product fluid from the pressurized feed fluid, each of the spiral module means comprising:
       1. collector tube means defining a longitudinally extending product fluid tube channel,
       2. spiral reverse osmosis fabric panel means cooperating with said tube means and having adjacent spiral layers wound around said tube means,
       3. said spiral panel means defining product fluid flow passages connected to said tube channel so that the product fluid forced from the feed fluid passes into said flow passages and then passes into said tube channel; and
    b. said pressure vessel means having a feed fluid inlet and a feed fluid outlet spaced apart by said spiral module means for maintaining the pressurized feed fluid in contact with said panel means of said module means and further having a product fluid outlet connected to each of said collector tube means.

12. The reverse osmosis system of claim 11 in which said spiral modules define void areas within said pressure vessel means, and said pressure vessel means includes insert means positioned in said void areas so that the pressurized feed fluid is directed to flow through said spiral modules between said feed fluid inlet and said feed fluid outlet.

13. The reverse osmosis system of claim 11 in which said fabric panel means is a plurality of fabric panels in which selected portions of each of said fabric panels are nonplanar.

14. The reverse osmosis system of claim 11 in which said fabric panel means is a plurality of fabric panels in which said fabric panels are nonwoven.

PO-1050
(5/69)

UNITED STATES PATENT OFFICE
CERTIFICATE OF CORRECTION

Patent No. 3,554,378      Dated January 12, 1971

Inventor(s) Arthur L. Kohl

It is certified that error appears in the above-identified patent and that said Letters Patent are hereby corrected as shown below:

Column 1, lines 46-55, material after "effect[1]," and before "and" (line 55) should be a footnote.

Column 3, line 6, "1" should read --10--; line 38, cancel beginning with "The col-" to and including "collects in line 40; line 52, "is" should read --as--; line 70, "pressures" should read --pressure--.

Column 4, line 8, cancel beginning with ", could be joi: to and including "FIG. 5" in line 11.

Signed and sealed this 10th day of August 1971.

(SEAL)
Attest:

EDWARD M. FLETCHER, JR.
Attesting Officer

WILLIAM E. SCHUYLER, JR.
Commissioner of Patents